May 31, 1960  F. W. BROWN  2,938,278
ELEVATION GATING CIRCUIT FOR RADAR SIMULATORS
Filed Oct. 30, 1956  4 Sheets-Sheet 1

INVENTOR.
FORREST W. BROWN
BY Erwin B. Steinberg
   agent

May 31, 1960  F. W. BROWN  2,938,278
ELEVATION GATING CIRCUIT FOR RADAR SIMULATORS
Filed Oct. 30, 1956  4 Sheets-Sheet 2

HEIGHT SWEEP

VOLTAGE COMPARISON DELAY CIRCUIT

INVENTOR.
FORREST W. BROWN
BY

May 31, 1960      F. W. BROWN      2,938,278
ELEVATION GATING CIRCUIT FOR RADAR SIMULATORS
Filed Oct. 30, 1956      4 Sheets-Sheet 3

INVENTOR.
FORREST W. BROWN

INVENTOR
FORREST W. BROWN
BY Ervin B. Steinberg
AGENT.

United States Patent Office 2,938,278
Patented May 31, 1960

2,938,278

ELEVATION GATING CIRCUIT FOR RADAR SIMULATORS

Forrest W. Brown, New Canaan, Conn., assignor to The Reflectone Corporation, Stamford, Conn., a corporation of Connecticut Filed Oct. 30, 1956, Ser. No. 619,210

3 Claims. (Cl. 35—10.4)

This invention refers to a radar circuit and has particular reference to an elevation gating circuit for radar simulators.

Radar simulators are well known in the art having been used for many years in connection with training and simulation purposes. Most of the radar trainers simulate a plurality of targets some times 12, 30 or as many as 96 targets which move in longitude and latitude. Some of the more recent devices of this type include height information for targets in order to simulate realistically aircraft targets. This invention is restricted to the elevation gating portion of the radar circuit which provides the altitude information on the radar indicator.

In the prior art of developing altitude information for each target simulated, it has been a common practice to use an electro-mechanical resolver for each target, each being supplied with an electrical signal corresponding to altitude and an electrical signal corresponding to ground range. Furthermore mechanical information in the form of rotation proportional to the elevation angle of the target is provided so that an output corresponding to slant range is obtained. Servo mechanisms are required to adjust the resolver in order that the required input and output information are continually maintained at their correct values. The angle of target elevation and the angle of antenna scan are then compared in an elevation comparison circuit which causes an elevation gate signal to be produced whenever the angle of antenna elevation and the angle of target elevation are coincident. It readily will be apparent that these circuits must be duplicated for each individual target and that this plurality of resolvers and of servo mechanisms becomes very complex, bulky and expensive when thirty or more targets are being simulated.

One of the objects of this invention therefore is to provide an elevation gating circuit which avoids one or more of the disadvantages of prior art arrangements.

Another object of this invention is the provision of an elevation gating circuit which is devoid of electromechanical resolvers and of servo mechanisms.

Another object of this invention is the provision of a computing circuit which provides a radar signal upon coincidence of a range delayed and bearing gated radar signal and of an altitude gate signal.

A further object of this invention is to provide a computing mechanism which is characterized by utmost simplicity for a plurality of targets.

Another and further object of this invention is the provision of a circuit which is extremely incomplex when a plurality of targets are provided.

Still further and other objects of this invention will be apparent by reference to the following drawings in which.

Figure 1:
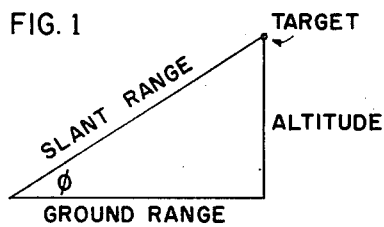
Figure 1 is a vector diagram applying to an elevated target.

Referring now to Figure 1, a target is shown which is elevated relative to the ground observation point so that the vector quantities are ground range, altitude, and slant range as shown. The angle $\phi$ between ground range component and slant range component may be considered the angle of elevation of the target.

Figure 2:
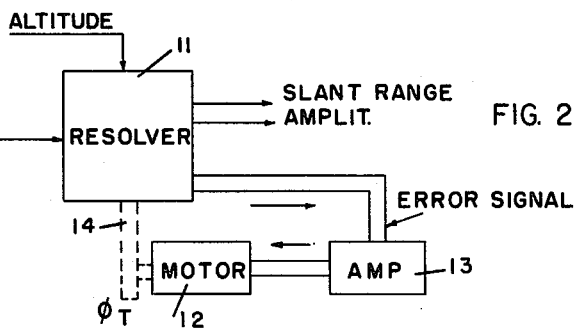
Figure 2 is a block diagram of a typical prior method for obtaining slant range amplitude and target elevation angle.

A typical prior method of solution is shown in Figure 2 wherein numeral 11 identifies a two-phase electromechanical resolver having two 90 degrees phase shifted primary and two 90 degrees phase shifted secondary windings. One of the primary windings is supplied with an electrical signal which is proportional to the altitude of the target and the other winding is supplied with a signal proportional to the ground range of the target. The resolver rotor is mechanically coupled to a motor 12 controlled by amplifier 13 in such a manner that amplifier 13 senses the error signal in one of the output windings and adjusts the resolver until the signal in that winding is substantially zero (null seeking network). At this instance, the angular position of resolver shaft 14 is a measure of the angle of elevation of the target. Still further, at this instance when one of the primary output windings is at zero signal, the other output winding (90 degrees phase with respect to the first winding) will receive its maximum signal thereby indicating slant range, the hypothenuse of Figure 1.

Figure 3:
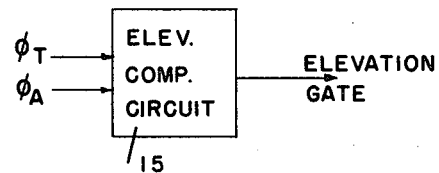
Figure 3 is a block diagram illustrating the comparison of angle of elevation of radar antenna with that of the target.

Figure 3 shows a block diagram wherein the elevation angle of the target and the elevation angle of the antenna are compared by means of a comparison circuit 15 and an elevation gate signal is produced only when both angles are coinciding. It will be apparent that if the angles do not coincide, the antenna is not directed toward the target.

It will be apparent further that the components of the Figures 2 and 3 must be duplicated for each individual target and that in view of the resolvers, amplifiers and motors, this method of solving the problem of elevation gating becomes very complex and bulky when a plurality of targets is used.

Figure 4:
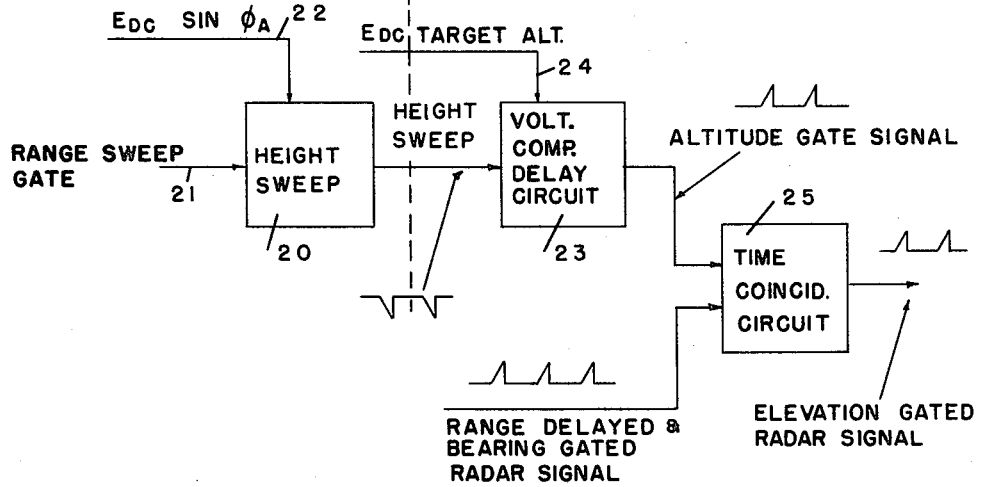
Figure 4 is a block diagram showing the method of obtaining an elevation gated radar signal in accordance with the present invention.

Figure 4 shows a block diagram of the method employed in accordance with the instant disclosure. It should be noted that conventional means are used to produce a simulated radar signal which is time delayed as a function of range and gated as a function of bearing deviation between antenna bearing and target bearing. Methods for achieving this signal are well known in the prior art and do not constitute a part of the present invention. The present invention is restricted to the means for gating a range delayed radar signal as a function of the deviation between the simulated target elevation angle and the simulated antenna elevation angle.

Numeral 20 of Figure 4 identifies a height sweep circuit which is supplied with a range sweep gate signal 21 and with a D.-C. signal 22 proportional to the sine of the elevation angle of the antenna. The output from the height sweep circuit representing a height sweep signal, is supplied to a voltage comparison delay circuit 23 which is supplied also with a D.-C. signal 24 proportional to the target altitude. The output from this voltage comparison circuit, being an altitude gate signal, is supplied to a coincidence circuit 25. Another signal, a range delayed and bearing gated radar signal, generated in a conventional manner, is also supplied to this coincidence circuit 25. When there is time coincidence between the two range delayed signals, the radar signal is permitted to pass through the coincidence circuit 25 and appear as a display on the radar indicator.

Figure 8:
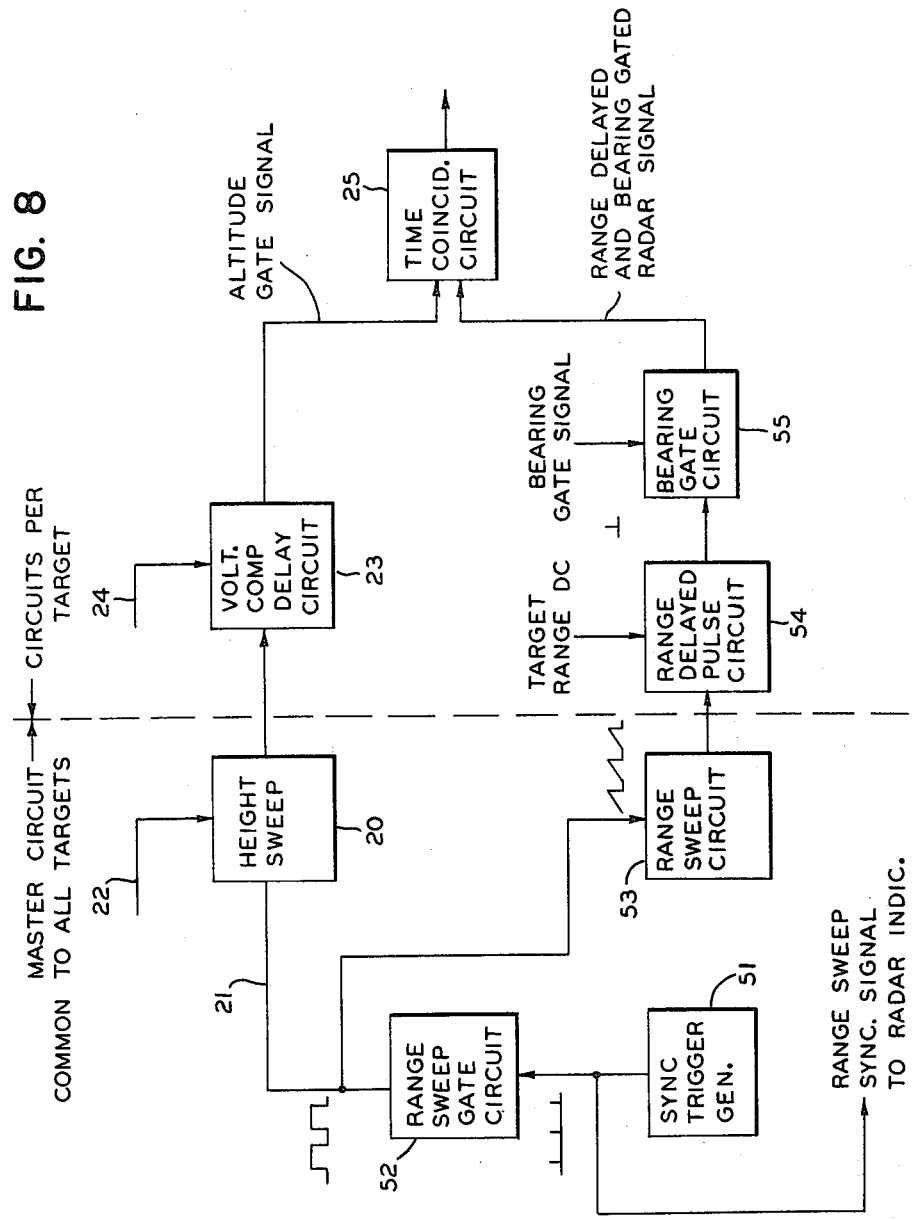
Figure 8 is a schematic block diagram of the substantially complete radar circuit including the portion shown in Figure 4.

Figure 8 shows the substantially complete radar circuit which includes the blocks illustrated in Figure 4. A trigger generator 51 provides an activating synchronizing pulse signal to the range sweep circuits in the radar indicator (not shown) and also a trigger signal to the sweep gate circuit 52. The sweep gate signal generated by the sweep gate circuit controls the generation of a range sweep signal in range sweep circuit 53 and also initiates the operation of the height sweep circuit 20 thereby synchronizing the range sweep signal with the height sweep signal.

The range sweep signal from circuit 53 is then compared with a direct current voltage proportional to target ground range so as to produce a radar signal pulse which is delayed as a function of target range, circuit 54. The signal generated in the range delayed pulse circuit is subsequently amplitude modulated by means of a bearing gate circuit 55 which is operating as a function of the deviation of target bearing from the radar antenna bearing. This range delayed and bearing modulated radar signal is fed to the time coincidence circuit 25 and appears as output therefrom upon time coincidence with the altitude gate signal derived from height sweep circuit 20 and voltage comparison delay circuit 23.

Figure 5:
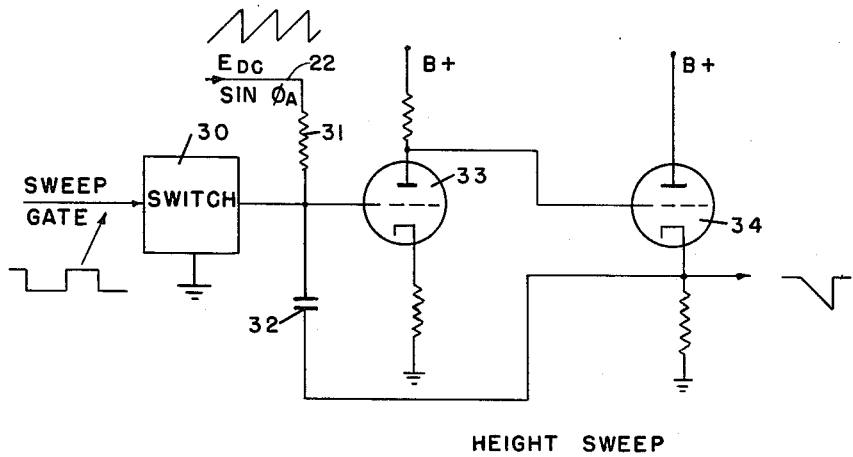
Figure 5 is a schematic circuit diagram of the height sweep contained in block form in Figure 4.
Figure 6:
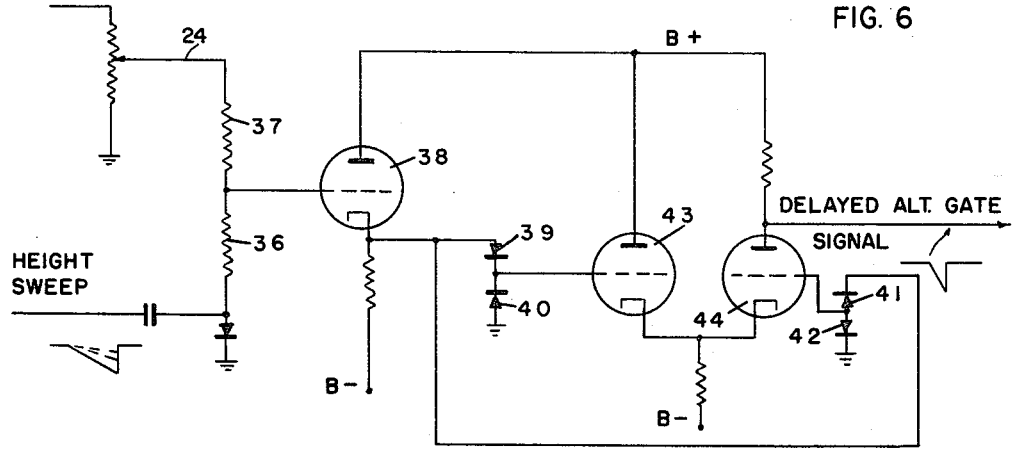
Figure 6 is a schematic circuit diagram of the voltage comparison delay circuit contained in block form in Figure 4.

For typical circuits which apply to the circuits 20 and 23, reference is made to Figures 5 and 6. Figure 5 is a schematic circuit diagram of the height sweep comprising mainly an electronic switch 30, resistor-capacitor network 31, 32, and electron tube 33 and a cathode follower tube 34.

The rate of rise of the sweep voltage appearing at the output of cathode follower 34 is dependent upon the value of the charging voltage $E_{DC}$ as R and C are constant. Voltage $E_{DC}$ in turn, is proportional to the sine of the antenna elevation angle $\phi_A$, it being produced by means of a function potentiometer or sawtooth oscillator whose frequency is proportional to the elevation scan rate of the simulated radar antenna. Therefore, the rate of rise or slope of the output sweep voltage is proportional to the sine $\phi_A$. This circuit in general, is a so-called "Miller" type circuit and is described for instance in "Electronic Instruments" (book), Greenwood et al., MIT Radiation Lab. Series, vol. 21, McGraw-Hill Book Publishing Co., New York, 1948, page 81, particularly Figure 4.24.

The purpose of the height sweep circuit is to generate a linear voltage sweep signal which is synchronized in time with the range sweep on the associated radar indicator and whose rate of rise and/or peak amplitude is directly proportional to the sine of the angle of elevation of the radar antenna.

The sweep gate signal is derived from a synchronizing pulse which is applied simultaneously to the range sweep circuit in the radar indicator. The D.-C. voltage indicating sin $\phi_A$ is derived from the radar antenna circuits or from a simulated radar antenna scan device. The switch 30 is an electronic clamping circuit controlled by the sweep gate signal and returns control electrode of tube 33 to zero voltage reference level at the termination of each range sweep cycle.

When switch 30 is open at the start of the sweep gate signal, control grid of tube 33 is permitted to rise in voltage as capacitor 32 charges through resistor 31 from voltage source $E_{DC}$. As this control electrode rises in voltage, the anode of tube 33 decreases in voltage more rapidly due to the voltage gain characteristics of the circuit. Cathode follower 34 is directly coupled to the anode of tube 33 so that the voltage on the cathode of tube 34 follows closely the voltage drop at the anode of tube 33. One side of capacitor 32 being connected to the cathode of tube 34 falls rapidly in voltage as the control electrode of tube 33 rises slightly. The net result of the circuit is to maintain a nearly constant voltage drop across resistor 31 to provide constant current charging of capacitor 32 and a resulting linear rise in the output voltage. Since the values of resistor 31 and capacitor 32 are fixed, the charging rate and hence the rate of change of the output signal is proportional to the applied voltage $E_{DC}$.

The purpose of the height sweep signal is to provide an elevation gating signal which is delayed in time with respect to the initiation of the radar indicator range sweep. The elevation gate signal is produced upon D.-C. voltage coincidence of the height sweep signal and a D.-C. voltage representing target altitude, see Figure 7.

The height sweep signal is supplied to a resistive adding network operating as a comparison circuit and comprises resistors 36 and 37 (Figure 6). The other input to this comparison network comprises a D.-C. signal proportional to the altitude of the target simulated. The resultant signal is supplied to the control electrode of electron tube 38, used as a cathode follower. Rectifiers 39, 40, 41 and 42, together with electron tubes 43 and 44, form a conventional diode gate circuit which produces a gate signal when the input signal passes through ground potential (zero resultant voltage on the resistive network). Rectifiers 39 and 40 are so connected that the control electrode of tube 43 may not fall below ground potential due to the forward conductance of rectifier 40. Rectifiers 41 and 42 are so connected that the control electrode of tube 44 cannot rise above ground potential. The only condition for conductance of tube 44 occurs when the signal voltage at the cathode of tube 38 is at or near ground potential. The output signal appearing at the anode of electron tube 44, the delayed altitude gate signal is phase-inverted in an amplifier (not shown) and applied to a time coincidence circuit 25 (Figure 4). The altitude gate signal, anode of tube 44, is delayed in time with respect to the range sweep signal as a function of the time of amplitude coincidence of the target altitude D.-C. and the height sweep signal. This signal is used for time comparison with the range delayed target signal to provide antenna elevation gating of the latter. This coincidence circuit receives also the range delayed and bearing gated radar signal. This radar signal is a signal delayed as a function of target range and gated as a function of the bearing of the antenna beam with respect to target bearing. It is further gated as a function of coincidence of antenna elevation and target elevation. Circuit 25 again comprises in part a summing network and an electron tube which operates as a gate when both input signals are coincident. This circuit may consist of a cathode follower tube circuit which is biased beyond cut-off to a point which requires input voltage comparable to the sum of the two signal voltages for operation above cut-off for an output signal. Typical time coincidence circuits may be found in "Electronics" (book) by Elmore and Sands, Coincidence Circuits, pages 120 to 123, particularly Figure 2.46 published by McGraw-Hill Book Co., New York, N.Y. (1949); or "Waveforms" (book) by B. Chance et al., Chapter 10 entitled "Time Selection," page 364, et seq. MIT Radiation Laboratory Series, vol. 19, published by McGraw-Hill Book Co., New York, N.Y. (1949).

It will be apparent that the voltage comparison delay circuit 23 and time coincidence circuit 25 are associated with one target and are duplicated for each of the targets employed. The height sweep circuit and its preceding sweep gate circuit (not shown) are common for a plurality of targets. In a similar manner, the range delayed and bearing gated radar signal is associated with one target, whereas some of its preceding circuits are common to all targets simulated.

Figure 7:
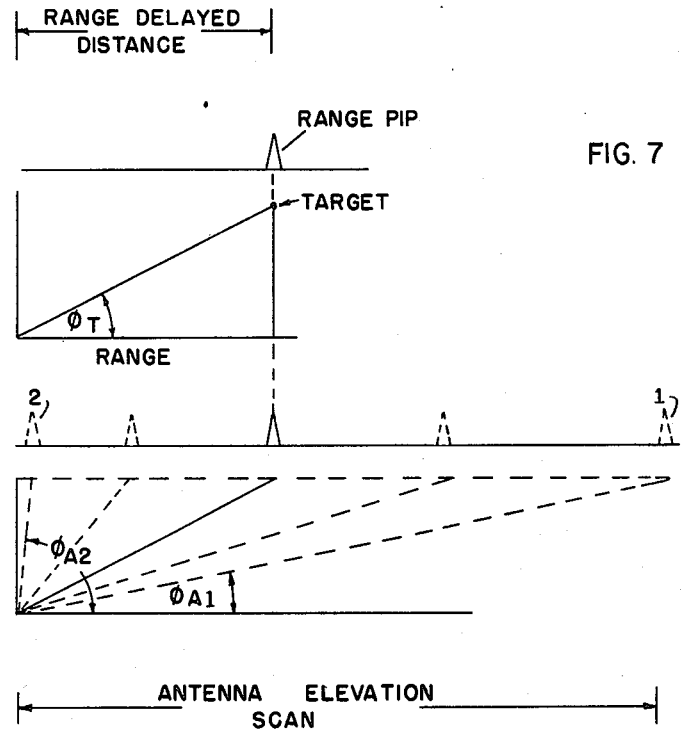
Figure 7 is a sketch illustrating graphically the principle of the solution.

The graphical embodiment of the foregoing solution may be more readily visualized by reference to Figure 7. A target is shown at a certain range with the conventional radar "range pip" occurring at the range delayed distance. As the antenna scans in elevation through its angular limits between $\phi_{A_1}$ and $\phi_{A_2}$, the altitude gate signal decreases in time range from position of "pip" 1 to position of "pip" 2. When coincidence of the target range signal pip and the delayed altitude gate signal occurs, the correct solution is achieved.

It will be apparent that the circuits described above employ a minimum number of components and are devoid of bulky electromechanical and mechanical components thus achieving a great simplification when a plurality of targets are simulated for classroom purposes. Particularly the saving in space, weight and materials causes the trainer to be useable aboard ship or aircraft and constitutes a major advantage.

While there has been described a certain embodiment of the present invention it will be understood by those skilled in the art that many variations and modifications may be made therein without departing from the principle and spirit of the invention which should be limited only by the scope of the appended claims.

What is claimed is:

1. In a radar target simulator which includes a simulated antenna elevation scan, range and altitude information of the target, the combination of means for generating a range sweep gate signal; a height sweep circuit receiving said range sweep gate signal; a signal proportional to the sine of the angle of elevation of the simulated antenna applied to said height sweep circuit to produce a height sweep signal; a voltage comparison delay circuit receiving said height sweep signal; a signal proportional to the altitude of the target simulated also supplied to said voltage comparison delay circuit to cause said circuit to produce an altitute gate signal; means producing a range delayed and bearing gated radar signal; a time coincidence circuit receiving said range delayed and bearing gated radar signal and receiving also said altitude gate signal to cause an elevation gated radar signal when said gate signal and said radar signal are coincident.

2. In a radar targets simulator which includes a simulated antenna elevation scan, range and altitude information of targets, the combination of means for generating a range sweep gate signal; a height sweep circuit receiving said range sweep gate signal; a signal proportional to the sine of the angle of elevation of the simulated antenna applied to said height sweep circuit to produce a height sweep signal; a plurality of voltage comparison delay circuits, one associated with each target, receiving said height sweep signal; a signal proportional to the altitude of each target simulated also supplied to one of said voltage comparison delay circuits to cause said circuit to produce an altitude gate signal; means producing a range delayed and bearing gated radar signal for each target; a plurality of time coincidence circuits receiving one of said range delayed and bearing gated radar signals and receiving also the altitude gate signal associated with the respective target to cause an elevation gated radar signal when said corresponding gate and radar signals are coincident.

3. In a radar target simulator which includes a simulated antenna elevation scan, range and altitude information of the target, the combination of means for generating a range sweep gate signal; a height sweep circuit receiving said range sweep gate signal; a direct current signal proportional to the sine of the angle of elevation of the simulated antenna applied to said height sweep circuit to produce a height sweep signal; a voltage comparison delay circuit receiving said height sweep signal; a direct current signal proportional to the altitude of the target simulated also supplied to said voltage comparison delay circuit to cause said circuit to produce an altitude gate signal; means producing a range delayed and bearing gated radar signal; a time coincidence circuit receiving said range delayed and bearing gated radar signal and receiving also said altitude gate signal to cause an elevation gated radar signal when said gate signal and said radar signal are coincident.

References Cited in the file of this patent

UNITED STATES PATENTS

| | | |
|---|---|---|
| 2,510,529 | Takats | June 6, 1950 |
| 2,677,199 | Droz | May 4, 1954 |
| 2,744,339 | Paine | May 8, 1956 |
| 2,811,789 | Paine | Nov. 5, 1957 |
| 2,832,953 | Tasker et al. | Apr. 29, 1958 |

OTHER REFERENCES

Dummer: Aids to Training, The Design of Radar Synthetic Training Devices for the R.A.F., Proceedings of Institution of Electrical Engineers, part 3, March 1949, pages 101 to 112.